(12) United States Patent
Jang (10) Patent No.: US 9,051,015 B2
(45) Date of Patent: Jun. 9, 2015

(54) VEHICLE BODY ASSEMBLE SYSTEM

(75) Inventor: Yoon Jang, Incheon (KR)

(73) Assignee: Hyundai Motor Company, Seoul (KR)

( * ) Notice: Subject to any disclaimer, the term of this patent is extended or adjusted under 35 U.S.C. 154(b) by 381 days.

(21) Appl. No.: 13/562,857

(22) Filed: Jul. 31, 2012

(65) Prior Publication Data

US 2013/0145616 A1 Jun. 13, 2013

(30) Foreign Application Priority Data

Dec. 7, 2011 (KR) .......................... 10-2011-0130554

(51) Int. Cl.
*B25B 27/14* (2006.01)
*B62D 65/18* (2006.01)
*B62D 65/02* (2006.01)

(52) U.S. Cl.
CPC ........... *B62D 65/18* (2013.01); *Y10T 29/53539* (2015.01); *Y10T 29/53961* (2015.01); *B62D 65/026* (2013.01)

(58) Field of Classification Search
CPC ...... B21D 53/88; B62D 65/00; B23P 21/004; B23P 2700/50; B23P 19/04; Y10T 29/53961; Y10T 29/53539
USPC ........ 29/897, 897.2, 429, 430, 431, 791–795, 29/822, 823, 240, 281.1, 281.4, 281.5
See application file for complete search history.

(56) References Cited

U.S. PATENT DOCUMENTS

| | | | | |
|---|---|---|---|---|
| 5,184,766 A | * | 2/1993 | Takahashi et al. | 228/4.1 |
| 5,267,683 A | * | 12/1993 | Hamada et al. | 228/4.1 |
| 6,138,889 A | * | 10/2000 | Campani et al. | 228/4.1 |
| 6,344,629 B1 | * | 2/2002 | Kato et al. | 219/148 |
| 6,421,893 B1 | * | 7/2002 | Katayama et al. | 29/33 K |

FOREIGN PATENT DOCUMENTS

| | | |
|---|---|---|
| JP | 05124549 A | 5/1993 |
| JP | 2000177663 A | 6/2000 |
| JP | 2003170870 A | 6/2003 |
| JP | 2009096218 A | 5/2009 |
| JP | 2009154815 A | 7/2009 |
| JP | 2011121436 A | 6/2011 |
| KR | 10-0621908 B1 | 9/2006 |
| KR | 10-0893605 | 4/2009 |
| KR | 10-2009-0058240 A | 6/2009 |
| KR | 10-2009-0098157 A | 9/2009 |

* cited by examiner

*Primary Examiner* — Ryan J Walters
(74) *Attorney, Agent, or Firm* — Mintz Levin Cohn Ferris Glovsky and Popeo, P.C.; Peter F. Corless (57) ABSTRACT

A vehicle body assemble system includes a moving unit loaded with a floor panel of a vehicle body that is configured to move the floor panel to a working place of a main buck process. A robot hanger clamps a side panel transferred to the working place from an inside of the side panel and rotates the side panel accordingly. An arranging jig is disposed on each side portion of the working place and is moveable up and down and arranges the side panel rotated by the robot hanger in an upright position. A side common jig is mounted to a handling robot and clamps the side panel on the arranging jig. Finally, a side post unit is disposed each side of the floor panel, clamps the side common jig, and moves the side common jig to each side of the floor panel.

12 Claims, 6 Drawing Sheets

VEHICLE BODY ASSEMBLE SYSTEM

CROSS-REFERENCE TO RELATED APPLICATION

This application claims priority to and the benefit of Korean Patent Application No. 10-2011-0130554 filed in the Korean Intellectual Property Office on Dec. 7, 2011, the entire contents of which are incorporated herein by reference.

BACKGROUND OF THE INVENTION (a) Field of the Invention

The present invention relates to a vehicle body assemble system. More particularly, the present invention relates to a vehicle body assemble system undergoing a vehicle body build-up process.

(b) Description of the Related Art

Generally, after being manufactured through various press apparatuses, the panels are transmitted to a vehicle body factory during a first stage of vehicle manufacturing process. The panels are assembled with each other so as to form a vehicle body referred to as a body in white (B.I.W) shape.

A vehicle body is typically made up of a floor panel supporting a driving portion such as an engine and a driving axle and a seat, two side panels forming side portions of the vehicle body, a roof panel forming an upper portion of the vehicle body, a plurality of roof rails, a cowl panel, a back panel, package tray and so on.

The vehicle body is assembled by the elements in vehicle body build-up process (it is also called as a main buck process). In the vehicle body build-up process, the floor panel is assembled with the back panel, and then the panels, the roof panel, the roof rail, the cowl panel and package tray are assembled by welding through a vehicle body assemble system.

The vehicle body assemble system clamps a side panel through a side hanger and a side gate and sets on a floor panel, sets a roof panel, a roof rail, a cowl panel and package trays on the side panel and then welds each elements using a welding robot.

However, in a conventional art, the side gate is provided with units for clamping the side panel, welding guns for connecting the side panel with the roof panel and the side panel with the floor panel. And thus size of a jig base requires a significant number of components, and thus the size and weight of the side gate must be increased as a result. Therefore, in a conventional art, the time required to set up the equipment is extenuated, welding characteristics are deteriorated and investment costs are increased as a result.

Also, in a conventional art, since the weight of the side gate is quite heavy, and the side gate is fixed to four different surfaces of a main rotary buck. Therefore, no more than 4 different models of vehicles may be assembled using the conventional equipment The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a vehicle body assemble system undergoing a vehicle body build-up process which may assemble more than 5 different models of vehicles using the same common robots.

A vehicle body assemble system according to an exemplary embodiment of the present invention may include a moving unit having a floor panel of a vehicle body loaded thereto and configured to move the floor panel to a working place of a main buck process. A robot hanger may be configured to clamp a side panel transferred to the working place from inside of the side panel and rotate the side panel accordingly. An arranging jig may be disposed on each side portion of the working place and configured to move up and down and arrange the side panel rotated by the robot hanger in an upright position. A side common jig which may be mounted to a handling robot and may be configured to clamp the side panel on the arranging jig. A side post unit may be disposed at each side of the floor panel and configured to clamp the side common jig and move the side common jig to each side of the floor panel.

The vehicle body assemble system may further include a side rear specific jig which is disposed at rear side of the side panel reciprocally and configured to clamp a rear portion of the side panel set on the floor panel. The vehicle body assemble system may further include a moving apparatus which is disposed on rear side of the side panel and may be configured to move reciprocally the side rear specific jig. The vehicle body assemble system may further include a storage unit disposed corresponding to the moving apparatus and of which the side rear specific jig of various vehicle models is stored thereto. More specifically, the side rear specific jig stored in the storage unit may be transferred to the moving apparatus by a handling robot.

The vehicle body assemble system may further include a first jig unit which is mounted to a handling robot on a front portion of the floor panel. The first jig unit may be configured to clamp a forward roof rail and set the forward roof rail to the side panel. A second jig unit may be mounted to a handling robot at a rear portion of the floor panel, and configured to clamp a rear roof rail and package trays and set the rear roof rail and package trays to the side panel.

The vehicle body assemble system may further include a moving hanger which is movable along a moving rail disposed on each side of the working place and is configured to transfer the side panel to the working place. A plurality of welding robots may be disposed on each side of the working place and may be configured to weld each connecting portion of the vehicle body.

The robot hanger may include a hanger frame mounted at one end of a robot and a plurality of clampers which are mounted to the hanger frame and are configured to clamp an inner side of the side panel. The arranging jig may clamp an inner side of the side panel. The side common jig may clamp an outer side of the side panel.

According to an exemplary embodiment of the present invention, in a main buck process of a vehicle body assemble line various kinds of main buck elements may be assembled using common robots and at least 5 kinds of vehicle models may be assembled using robots used for assembling elements of various vehicle models in common. Thus, various vehicle models may be assembled with more flexibility so mass production of various vehicle models may be realized with ease, working hours for preparation of equipment may be reduced, and initial investment may be decreased.

BRIEF DESCRIPTION OF THE DRAWINGS

The drawings illustrate exemplary embodiments of the present invention and are not construed to limit any aspect of the invention.

<Description of symbols>

| | |
|---|---|
| 110: moving unit | 130: moving hanger |
| 131: moving rail | 150: robot hanger |
| 151: hanger frame | 170: arranging jig |
| 171: base portion | 173: first clamping unit |
| 190: side common jig | 191: first jig frame |
| 193: second clamping unit | 210: side post unit |
| 211: post frame | 213: moving member |
| 215: third clamping unit | 230: rear specific jig |
| 231: second jig frame | 233: fourth clamping unit |
| 240: moving apparatus | 250: storage unit |
| 260: first jig unit | 261: fifth clamping unit |
| 270: second jig unit | 271: sixth clamping unit |
| 290: welding robot | |
| R1, R2, R3, R4, R5: handling robot | |

DETAILED DESCRIPTION OF THE EMBODIMENTS

Hereinafter, the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Description of components that are not necessary for explaining the present invention will be omitted, and the same constituent elements are denoted by the same reference numerals in this specification.

In addition, size and thickness of components shown in the drawings may be differ from real size and real thickness of the components for better comprehension and ease of description. Therefore, the present invention is not limited to those shown in the drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Figure 1:
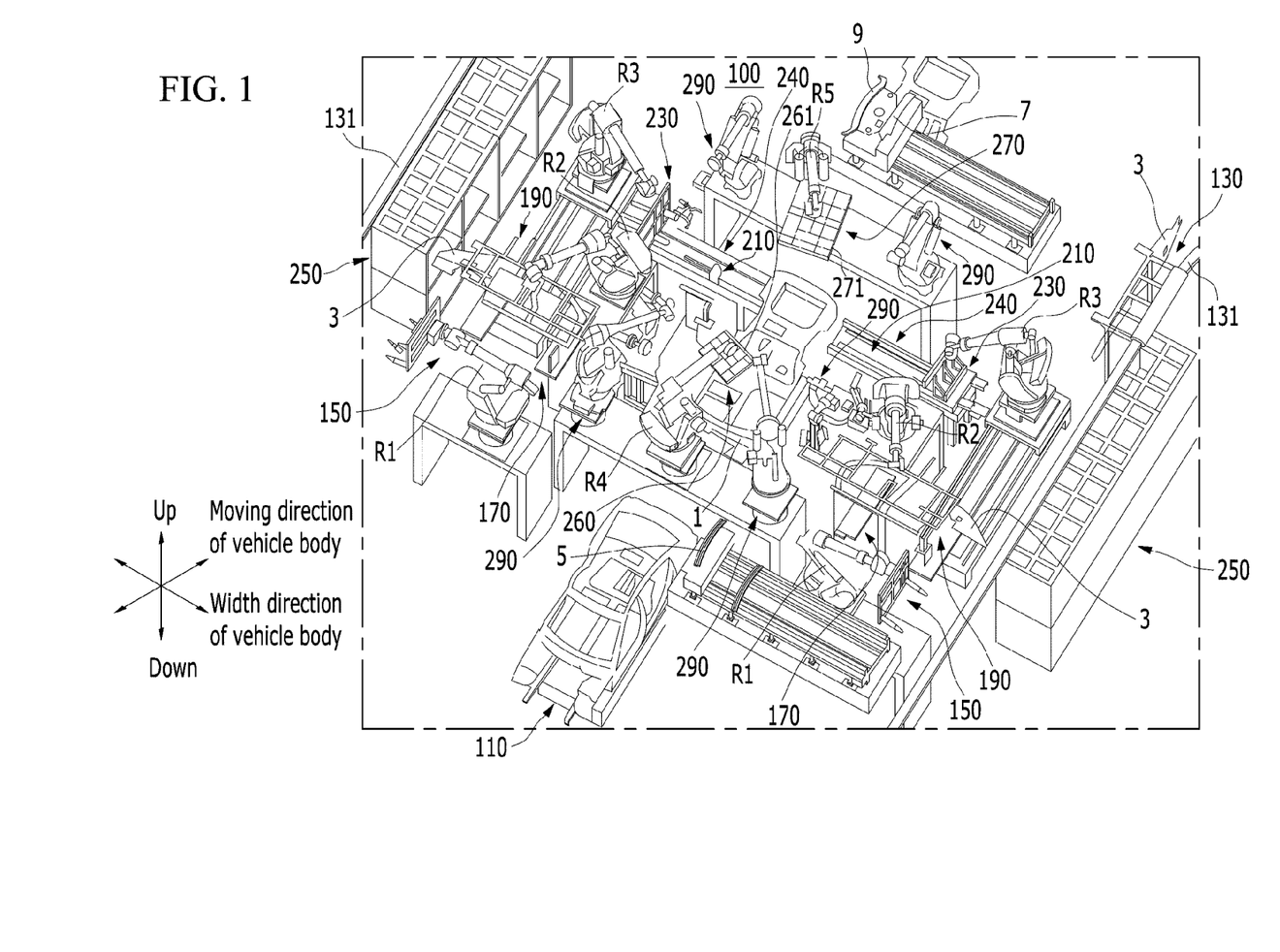
FIG. 1 is a drawing illustrating an overview of a vehicle body assemble system according to an exemplary embodiment of the present invention.

FIG. 1 is a drawing illustrating an overview of a vehicle body assemble system according to an exemplary embodiment of the present invention. Referring to FIG. 1, a vehicle body assemble system 100 according to an exemplary embodiment of the present invention is applied to a vehicle body build-up process (referred to my some skilled in the art as "a main buck process"), which assemble main buck assemble elements transported from a sub-manufacturing line to a vehicle body through a welding process.

Typically, the main buck assemble elements includes a floor panel, side panels, a roof panel, a cowl panel, a roof rail and a package tray. More specifically, the roof rail may include a front roof rail and a rear roof rail. The floor panel may be transported to a working room of the vehicle body build-up process by a moving cart and the side panels may be matched up with the floor panel though a side gate of the main buck system.

Hereinafter, moving direction of the vehicle body is defined as direction of which the floor panel moves along. Typically, the moving direction of the vehicle body is defined as "T direction," width direction of the vehicle body is defined as "L direction" and height direction of the vehicle body is defined as "H direction". However, in an exemplary embodiment of the present invention the description will be described according to the moving direction of the vehicle body, the width direction and height direction of the vehicle body.

According to an exemplary embodiment of the present invention, in a main buck process of a vehicle body assemble line, the vehicle body assemble system 100 may assemble various kind of main buck elements using common robots so at least 5 different vehicle models may be assembled.

The vehicle body assemble system 100 according to an exemplary embodiment of the present invention includes a moving unit 110, a moving hanger 130, a robot hanger 150, an arranging jig 170, a side common jig 190, a side post unit 210, a side rear specific jig 230, a first jig unit 260, a second jig unit 270 and a welding robots 290. Each constituent element may be mounted to one base frame or divided base frame in a vehicle body assemble line of a main buck process.

In an exemplary embodiment of the present invention, the base frame may be a base frame supporting constituent elements and may include a bracket, supporting blocks and so on. Thus, in the present exemplary embodiment, above each constituent element will be referred to as the base frame.

In an exemplary embodiment of the present invention, the moving unit 110 is, while loading a floor panel 1 of a vehicle body, and may be configured to transfer the floor panel 1 to a working place of a main buck process. The moving unit 110 movable to the base frame (not shown) along the main buck process and a plurality of jigs may be disposed for supporting the floor panel 1.

In an exemplary embodiment of the present invention, the moving hanger 130 may be configured to transfer a side panel 3 which will be assembled to each side of the floor panel 1 to the working place of the main buck process (hereinafter, referred to as a "working place" for convenience). The moving hanger 130 is movably disposed on a moving rail 131 which is disposed on each side of the working place along the moving direction of the moving unit 110.

Figure 2:
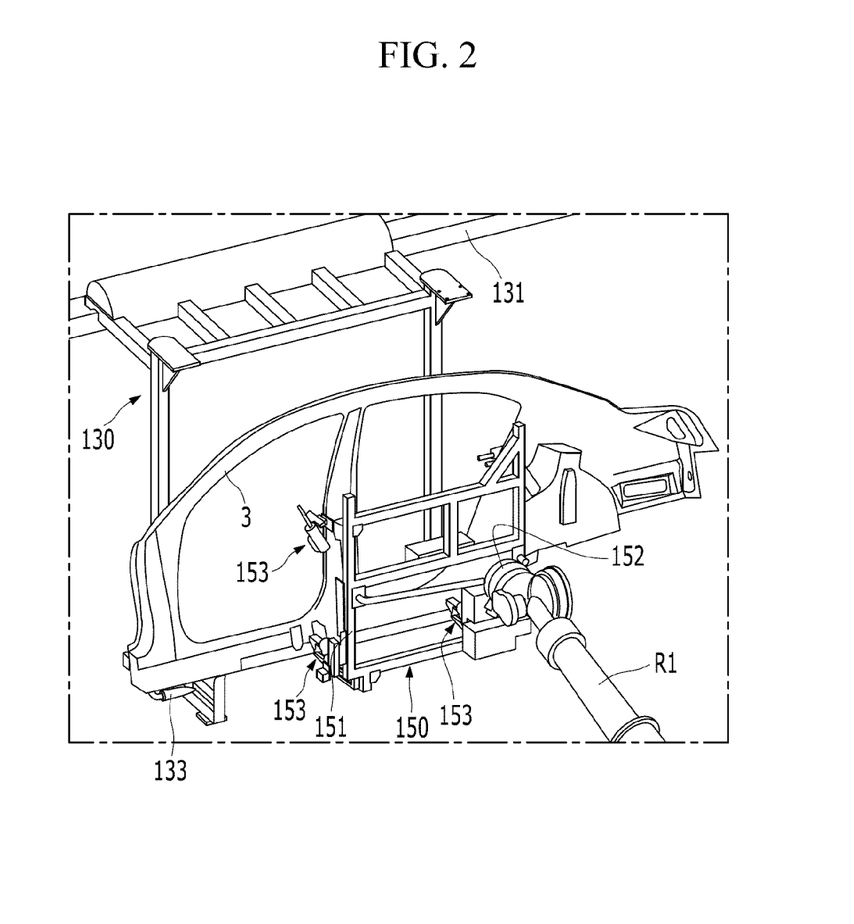
FIG. 2 is a drawing illustrating a moving hanger and a robot hanger applied to a vehicle body assemble system according to an exemplary embodiment of the present invention.

The moving hanger 130, as shown in FIG. 2, is provided with an attachment 133 supporting a lower portion of the side panel 3. In this case, the moving hanger 130, supporting the side panel 3, transfers the side panel 3 to the working place along the moving rail 131, and an inner side of the side panel 3 is disposed to face to the working place.

In an exemplary embodiment of the present invention, the robot hanger 150 may be configured to clamp the inner side of the side panel 3 transferred to the working place and rotate the side panel 3. For the side common jig 190 to clamp an outer side of the side panel 3 and to match up with the floor panel 1, the robot hanger 150 clamps the inner side of the side panel 3 and rotate the side panel 3.

The robot hanger 150, as shown in FIG. 1, is disposed on both sides of the working place respectively. The robot hanger 150, as shown in FIG. 2, includes a hanger frame 151 which is disposed on one end of a hanger robot R1 through a tool changer 152, and a plurality of the first clampers 153 which are mounted to a hanger frame 151 and clamps the inner side of the side panel 3. The first dampers 153 may be any clamping device well known to a person skilled in the art, and thus detailed description will be omitted in the specification.

Figure 3:
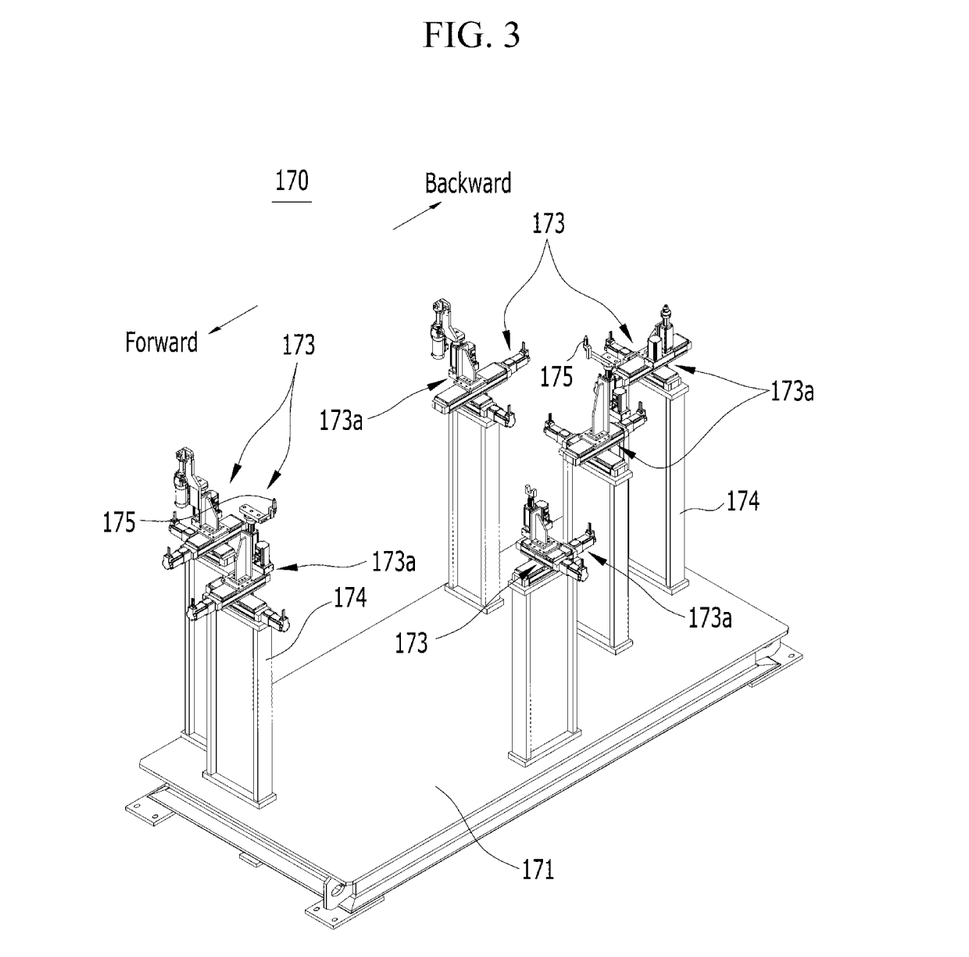
FIG. 3 is a drawing illustrating an arranging jig applied to a vehicle body assemble system according to an exemplary embodiment of the present invention.

In an exemplary embodiment of the present invention, the arranging jig 170 may be configured to arrange the side panel 3 rotated by the robot hanger 150 in an upright position (at a predetermined position). The arranging jig 170 is disposed to sides of the working place movable up and down, clamps the inner side of the side panel 3, which is rotated by the robot hanger 150 and of which the outer side faces upward. The arranging jig 170, as shown in FIG. 3, includes a base portion 171, which may be moved up and down by an elevating device (not shown), and a plurality of the first clamping units 173 disposed to the base portion 171.

The first clamping unit 173 may be disposed in an upper portion of the base portion 171 though a mounting bracket 174 and is movable in multiple directions by means of a multiple driving unit 173a. The multiple driving unit 173a may move the first clamping unit 173 to up and down, left and right, and forward and rearward (in relation to FIG. 3. For example the multiple driving unit 173a may be a three-dimensional motor cylinder and may move the first aligning pin along moving direction of the vehicle body, width direction of the vehicle body, or upward/downward of the vehicle body. So that the first clamping unit 173 may clamp various side panels of various vehicle models interchangeably. The scheme and operation of the multiple driving units 173a are well known to persons skilled in the art and thus detailed description will be omitted in the specification.

The first clamping unit 173 supports an upper portion of the side panel 3 and clamps a lower portion of the side panel 3 and positions the side panel 3 in an upright position by means of a first aligning pint 175. In this case, the first clamping unit 173 moves in an upward direction and supports the upper portion and lower portion of the side panel 3 while the outer side of the side panel 3 is faced in an upward direction by means of the robot hanger 150 and the base portion 171 is moved upward. Then the first clamping unit 173 moves downward to clamp the lower portion of the side panel 3, and arranges the side panel 3 using the first aligning pint 175.

The hanger frame 151 of the robot hanger 150, referring to FIG. 2, may be moved within a space between the mounting brackets 174 of the arranging jig 170. When the first clamping unit 173 supports the upper and lower portion of the side panel 3, the robot hanger 150 releases the side panel 3 and returns the hanger frame 151 to its initial position through the space between the mounting brackets 174.

Figure 4:
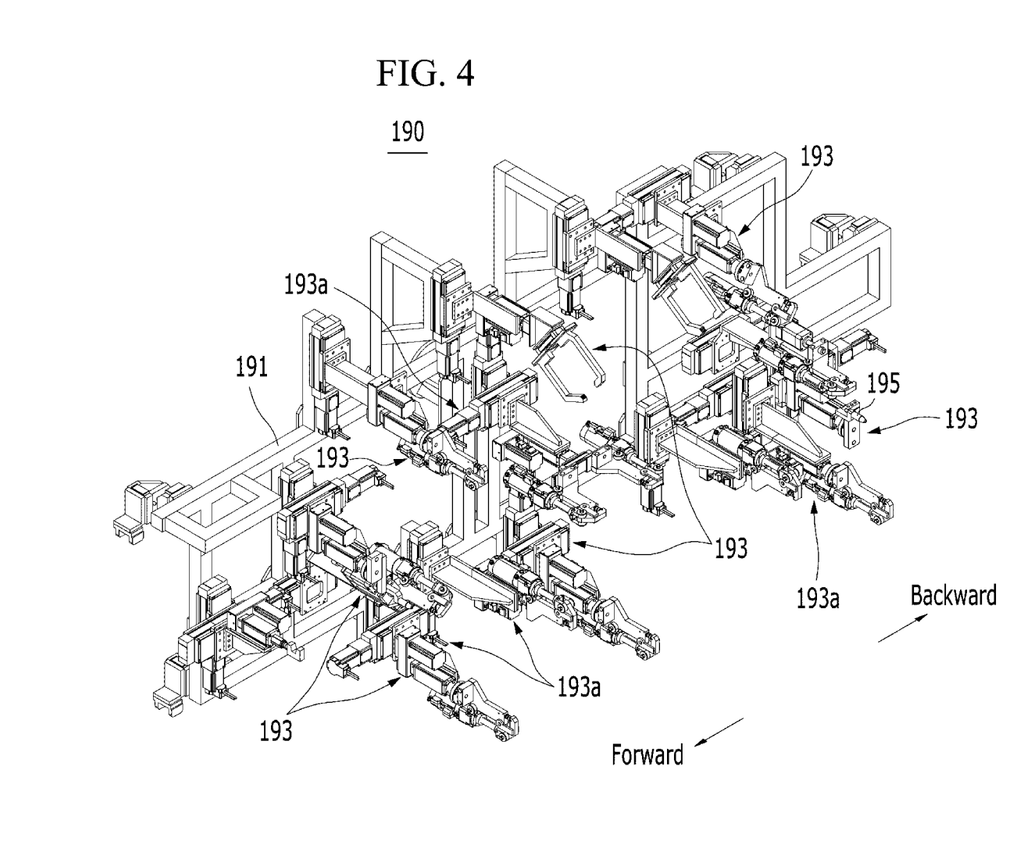
FIG. 4 is a drawing illustrating a side common jig applied to a vehicle body assemble system according to an exemplary embodiment of the present invention.

In an exemplary embodiment of the present invention, the side common jig 190 may be configured to clamp the side panel 3 supported by the arranging jig 170 and transfer the side panel 3 to the sides of the floor panel 1. The side common jig 190, as shown in FIG. 4, includes a first jig frame 191, which is mounted to handling robots R2 (referring to FIG. 1) on both sides of the working place, and a plurality of the second clamping units 193 disposed on the first jig frame 191.

The second clamping units 193 may be configured to clamp various types of side panels 3 of various vehicle models, and is movable in multiple directions by means of a multiple driving unit 193a. The multiple driving units 193a may move the second clamping units 193.

For example the multiple driving unit 193a may be a three-dimensional motor cylinder. The scheme and operation of the multiple driving unit 193a may be any one of those well know to a person skilled in the art and thus a detailed description will be omitted in the specification. The second clamping units 193 clamp the upper and lower portion of the side panel 3 and position the side panel 3 in an upright position by means of the second aligning pint 195.

The side common jig 190 transfers the side panel 3 to the sides of the floor panel 1 while clamping the outer portion of the side panel 3 supported by the arranging jig 170. The side common jig 190 mounted to the handling robot R2 rotates the side panel 3 for the inner portion of the side panel 3 to be faced toward the sides of the floor panel 1 and transfers the side panel 3 to the sides of the floor panel 1.

In an exemplary embodiment of the present invention, the side post unit 210 may be configured to position the side common jig 190 clamping the side panel 1 to the working place in the upright position and to match up the side panel 3 with the floor panel 1. The side post unit 210 may be disposed on both sides of the floor panel 1 respectively.

Figure 5:
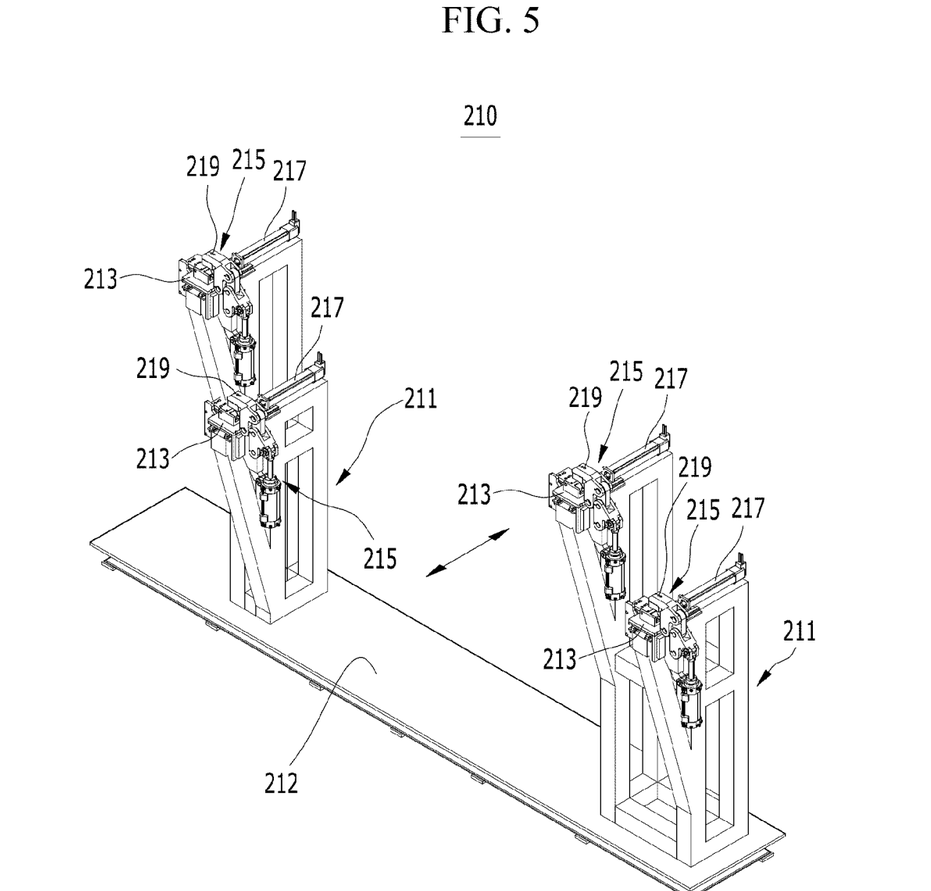
FIG. 5 is a drawing illustrating a side post unit applied to a vehicle body assemble system according to an exemplary embodiment of the present invention.

The side post unit 210, as shown in FIG. 5, includes a post frame 211 mounted to a base 212, a moving member 213 disposed to the post frame 211 movable toward the sides of the floor panel 1, and a third clamping unit 215 disposed on the moving member 213 and clamping the first jig frame 191 of the side common jig 190. The moving member 213 supports the first jig frame 191 of the side common jig 190, and is movable toward the sides of the floor panel 1 by means of a multiple driving unit 217 along the direction of the arrows indicated in FIG. 5.

The third clamping unit 215 may be a second damper 219 clamping the first jig frame 191 of the side common jig 190 loaded on the moving member 213. The first jig frame 191 of the side common jig 190 may be clamped by the second clamper 219 loaded on the moving member 213, transferred to both sides of the floor panel 1 by means of the moving member 213, and match up the side panel 3 with the floor panel 1.

Figure 6:
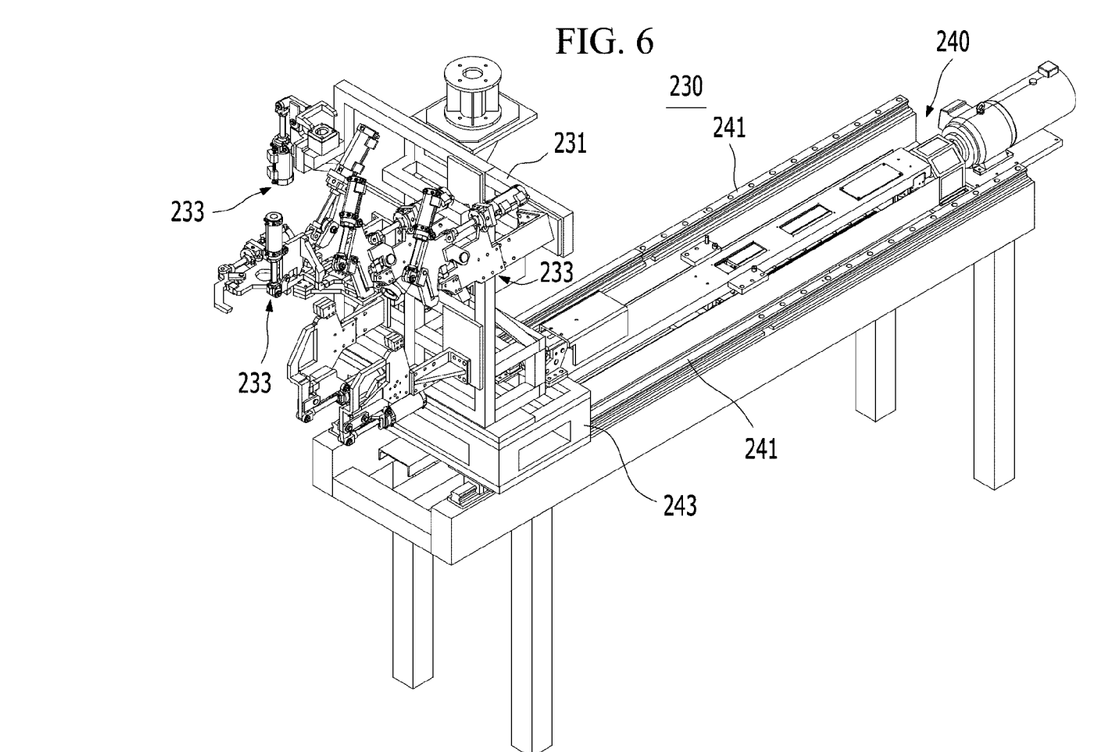
FIG. 6 is a drawing illustrating a side rear specific jig applied to a vehicle body assemble system according to an exemplary embodiment of the present invention.

In an exemplary embodiment of the present invention, the side rear specific jig 230 is configured to clamp the rear side of the side panel 3 which is set to the floor panel 1 by means of the side post unit 210. The side rear specific jig 230 may be movable to the rear side of the side panel 3 by means of the moving apparatus 240, and as shown in FIG. 6, includes a second jig frame 231 and fourth clamping units 233 mounted to the second jig frame 231. The fourth clamping unit 233 clamps the rear portion of the side panel 3.

The moving apparatus 240 may be configured to reciprocate the side rear specific jig 230 toward the rear side of the side panel 3, as shown in FIG. 1, and may be disposed on the rear side of the side panel 3. The moving apparatus 240 supports the side rear specific jig 230 and includes a slider 243 moving along a guide rail 241. The moving apparatus 240 may be an apparatus which converts the torque of a motor to linear motion and transfers the slider 243 linearly. This motion is well known to persons skilled in the art, and thus detailed description will be omitted in the specification.

The vehicle body assemble system according to an exemplary embodiment of the present invention, as shown in FIG. 1, further includes a storage unit 250 storing the side rear specific jig 230 for various vehicle models. The storage unit 250 may be disposed on both sides of working place corresponding to the moving apparatus 240 and includes a buffer jig (not shown) for temporarily storing the side rear specific jig 230. The side rear specific jig 230 stored in the storage unit 250 may be transferred to the moving apparatus 240 by a handling robot R3.

In an exemplary embodiment of the present invention, the first jig unit 260, as shown in FIG. 1, mounted to a handling robot R4, may be configured to clamp the forward roof rail 5 and be set on the side panel 3. The first jig unit 260 may be disposed on forward side of the floor panel 1, and include fifth clamping units 261, mounted to the handling robot R4, for clamping the forward roof rail 5. The fifth clamping units 261 may be configured to support the forward roof rail 5, clamp the forward roof rail 5, and position the forward roof rail 5 in an upright position.

In an exemplary embodiment of the present invention, the second jig unit 270, as shown in FIG. 1, which is mounted to a handling robot R5, may be configured to clamp the rear roof rail 7 and the package trays 9, and set the rear roof rail 7 and the package trays 9 on the side panel 3. The second jig unit 270 maybe disposed on the rear side of the floor panel 1, and may include a sixth clamping unit 271 which clamps the rear roof rail 7 and the package trays 9. The sixth clamping unit 271 may be mounted to the handling robot R5. The sixth clamping units 271 are configured to clamp the rear roof rail 7 and the package trays 9 and position the rear roof rail 7 and the package trays 9 in an upright position.

In an exemplary embodiment of the present invention, the welding robots 290, as shown in FIG. 1, are disposed along the sides of the moving unit 110, and weld each connecting portion of the side panel 3 set on the floor panel 1, and the forward and rear roof rail 5 and 7 and the package trays 9 set on the side panel 3. The welding robots 290 may be provided with a spot welding gun at the ends thereof, or any other welding mechanism well known to a person skilled in the art, and thus detailed description of the welding robot will be omitted in the specification.

Hereinafter, referring to the drawings, operations of the vehicle body assemble system 100 according to an exemplary embodiment of the present invention will be described.

In an exemplary embodiment of the present invention, the floor panel 1 assembled in a sub assemble line is transferred to the wording place through the moving unit 110. The moving hanger 130 transfers the side panel 3 which will be assembled to the floor panel 1 to the working place of the main buck process. In this case, the inner side of the side panel 3 is faced toward the working place. The robot hanger 150 clamps the inner side of the side panel 3 through the first clampers 153 and rotates the side panel 3. And then, the arranging jig 170 arranges the side panel 3 in an upright position.

In this case, the first clamping unit 173 of the arranging jig 170 moves upward to supports the upper portion and the lower portion of the side panel 3 while the upper side of the side panel faces upward and the base portion 171 is moved upward. The first clamping unit 173 moves downward to clamp the lower portion of side panel 3 and clamps the forward portion and rearward portion of the side panel 3 though the first aligning pint 175.

In this case, the hanger frame 151 of the robot hanger 150 is disposed in the space between the mounting bracket 174 of the arranging jig 170. Side panel 3 is released (from clamping) after the first clamping unit 173 supports the side panel 3 and the hanger frame 151 is returned to the original position from the space between the mounting brackets 174. Then, the side common jig 190 is transferred to the arranging jig 170 by means of the handling robot R2. The side common jig 190 then clamps the side panel 3 on the arranging jig 170 through the second clamping units 193 and the side panel 3 is transferred to the sides of the floor panel 1 by means of the handling robot R2.

The side common jig 190 rotates the side panel 3 by means of the handling robot R2 and transfers the side panel 3 to the sides of the floor panel 1 while the inner side of the side panel 3 is facing the floor panel 1. Next, the side common jig 190 is loaded on the moving member 213 of the side post unit 210 by means of the handling robot R2. Then the third clamping unit 215 of the side post unit 210 clamps the side common jig 190 and the side common jig 190 is transferred to the sides of the floor panel 1 by means of the moving member 213. The side common jig 190 clamping the side panel 3 moves to the sides of the floor panel 1 and matches up the side panel 3 with the floor panel 1.

In this process, the side rear specific jig 230 is transferred to the rear side of the side panel 3 by means of the moving apparatus 240 and clamps the rear portion of the side panel 3 by means of the fourth clamping unit 233. In this case, the side rear specific jig 230 stored in the storage unit 250 is transferred to the moving apparatus 240 by means of the handling robot R3 according to the specified vehicle model.

After the side panel 3 is set on the floor panel 3, the first jig unit 260 mounted to the handling robot R4 clamps the forward roof rail 5 by means of the fifth clamping unit 261 and then sets the forward roof rail 5 on the side panel 3. The second jig unit 270 mounted to the handling robot R5 clamps the rear roof rail 7 and the package trays 9 by means of the sixth clamping unit 271 and sets the rear roof rail 7 and the package trays 9 on the side panel 3.

As described above, after setting the side panel 3 on the floor panel 1 and setting the forward and the rear roof rail 5 and 7 and the package trays 9 on the side panel 3, the welding robots 290 welds each connecting portion.

Advantageously, the vehicle body assemble system 100 according to an exemplary embodiment of the present invention may assemble various main buck elements in the main buck process of the vehicle body assemble line using common robots. While in a conventional art, the side panel is fixed to four surfaces of a main rotary buck so no more than four different vehicle models may be assembled using the conventional system. In the illustrative embodiment of the present invention, however 5 or more different side panels of different vehicle models may be clamped using the side common jig 190 and the side post unit 210. And thus, various vehicle models may be assembled which great flexibility in the system so mass production of various vehicle models may be realized with ease, working hours for preparation of equipment may be reduced, and initial investment is reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. A vehicle body assemble system comprising:
a moving unit, loaded with a floor panel of a vehicle body configured to move the floor panel to a working place of a main buck process;
a robot hanger configured to clamp an inner side of a side panel transferred to the working and rotate the side panel;
an arranging jig configured to move up and down, the arranging jig being disposed on a side of the working place so as to arrange the side panel rotated by the robot hanger to an upright position;

a side common jig mounted to a handling robot of the vehicle body assemble system, the side common jig configured to clamp the side panel on the arranging jig; and a side post unit disposed on a side of the floor panel, and configured to clamp the side common jig and move the side common jig to the side of the floor panel.

2. The vehicle body assemble system of claim 1, wherein the vehicle body assemble system further comprises a side rear specific jig disposed on a rear side of the side panel and configured to clamp a rear portion of the side panel set on the floor panel.

3. The vehicle body assemble system of claim 2, wherein the vehicle body assemble system further comprises a moving apparatus disposed on a rear side of the side panel and configured to move the side rear specific jig toward the rear portion of the side panel.

4. The vehicle body assemble system of claim 3, wherein the vehicle body assemble system further comprises a storage unit disposed corresponding to the moving apparatus and of which the side rear specific jig of various vehicle models is stored thereto.

5. The vehicle body assemble system of claim 4, wherein the side rear specific jig stored in the storage unit is transferred to the moving apparatus by a handling robot.

6. The vehicle body assemble system of claim 2, wherein the vehicle body assemble system further comprises a first jig unit which is mounted to a handling robot at a front portion of the floor panel, and is configured to clamp a forward roof rail and set the forward roof rail on the side panel.

7. The vehicle body assemble system of claim 6, wherein the vehicle body assemble system further comprises a second jig unit mounted to a handling robot at a rear portion of the floor panel, and configured to clamp a rear roof rail and package trays and set the rear roof rail and package trays on the side panel.

8. The vehicle body assemble system of claim 2, wherein the vehicle body assemble system further comprises a moving hanger which is movable along a moving rail disposed on each side of the working place and configured to transfer the side panel to the working place.

9. The vehicle body assemble system of claim 2, wherein the vehicle body assemble system further comprises a plurality of welding robots disposed on each side of the working place and configured to weld each connecting portion of the vehicle body.

10. The vehicle body assemble system of claim 1, wherein the robot hanger comprises:

a hanger frame mounted to an end of a robot; and a plurality of clampers mounted to the hanger frame and configured to clamp an inner side of the side panel.

11. The vehicle body assemble system of claim 1, wherein the arranging jig clamps an inner side of the side panel.

12. The vehicle body assemble system of claim 1, wherein the side common jig clamps an outer side of the side panel.

* * * * *